United States Patent [19]
Swain et al.

[11] Patent Number: 5,893,568
[45] Date of Patent: Apr. 13, 1999

[54] SUBSTRATE SUPPORT DEVICE

[75] Inventors: Eugene A. Swain, Webster; Warren F. Brydges, Walworth, both of N.Y.

[73] Assignee: Xerox Corporation, Stamford, Conn.

[21] Appl. No.: 08/957,943

[22] Filed: Oct. 27, 1997

[51] Int. Cl.⁶ .................................................. B23B 31/117
[52] U.S. Cl. ......................... 279/2.22; 269/48.1; 279/145
[58] Field of Search .................................. 279/145, 2.22, 279/2.01, 2.21, 79; 269/46.1, 48.1

[56] References Cited

U.S. PATENT DOCUMENTS

| | | | |
|---|---|---|---|
| 5,282,888 | 2/1994 | Fukawa et al. | 118/500 |
| 5,320,364 | 6/1994 | Mistrater et al. | 279/2.17 |
| 5,322,300 | 6/1994 | Mistrater et al. | 279/2.17 |
| 5,324,049 | 6/1994 | Mistrater et al. | 279/2.17 |
| 5,328,181 | 7/1994 | Mistrater et al. | 279/2.17 |

FOREIGN PATENT DOCUMENTS

| | | | |
|---|---|---|---|
| 716715 | 2/1980 | U.S.S.R. | 279/2.22 |
| 1526924 | 12/1989 | U.S.S.R. | 279/2.22 |

*Primary Examiner*—Daniel W. Howell
*Assistant Examiner*—Rouzbeh Tabaddor
*Attorney, Agent, or Firm*—Zosan S. Soong

[57] ABSTRACT

A device for supporting a hollow substrate having two open ends in an aligned orientation, wherein one end of the substrate is engageable with a chuck assembly, including: (a) a base for contacting the other end of the substrate; (b) a post coupled to the base, wherein a section of the post is positioned within the substrate, thereby defining a substrate disposed post section; and (c) a spring apparatus coupled to the substrate disposed post section, wherein the spring apparatus is disposed within the substrate and contacts the substrate interior surface, wherein the spring apparatus is compressed by the substrate during misalignment of the substrate with the device and the compressed spring apparatus springs back to push the substrate to the aligned orientation with the device.

10 Claims, 5 Drawing Sheets

SUBSTRATE SUPPORT DEVICE

FIELD OF THE INVENTION

This invention relates to a device for supporting a hollow substrate in an aligned position.

BACKGROUND OF THE INVENTION

In manufacturing processes, it is common for multiple substrates to be handled or moved in a single operation by chucking apparatus. The chucking apparatus may need to temporarily position the substrates on support devices at various points during the manufacturing processes. This requires precision alignment of transfer hardware. However, with conventional equipment and processes, there is a significant risk of jamming and product damage due to the tight fits required for accurate placement. For example, FIG. 1 discloses a conventional noncompliant support device 2 made of metal or plastic wherein there is a tight fit between the substrate 4 and the support device 2. This tight fit and the unyielding surface of the conventional support device will cause the lockup problem: slight misalignment of the substrate on the support device will cause large side forces which, in turn, may prevent the chucking apparatus 6 from sliding the substrate on or off the support device.

Complicated and expensive mechanical linkages have been used to achieve compliance in automation design. However, there is a need, which the present invention addresses, for compliant substrate support devices that are simple, inexpensive, reliable, and suitable for a wide range of conditions, especially in clean room applications including for example during photoreceptor manufacturing.

The following documents disclose conventional chuck assemblies: Fukawa et al., U.S. Pat. No. 5,282,888; Mistrater et al., U.S. Pat. No. 5,322,300; Mistrater et al., U.S. Pat. No. 5,328,181; Mistrater et al., U.S. Pat. No. 5,320,364; and Mistrater et al., U.S. Pat. No. 5,324,049.

SUMMARY OF THE INVENTION

The present invention is accomplished in embodiments by providing a device for supporting a hollow substrate having two open ends in an aligned orientation, wherein one end of the substrate is engageable with a chuck assembly, comprising:

(a) a base for contacting the other end of the substrate;

(b) a post coupled to the base, wherein a section of the post is positioned within the substrate, thereby defining a substrate disposed post section; and (c) a spring apparatus coupled to the substrate disposed post section, wherein the spring apparatus is disposed within the substrate and contacts the substrate interior surface, wherein the spring apparatus is compressed by the substrate during misalignment of the substrate with the device and the compressed spring apparatus springs back to push the substrate to the aligned orientation with the device.

BRIEF DESCRIPTION OF THE DRAWINGS

Other aspects of the present invention will become apparent as the following description proceeds and upon reference to the Figures which represent preferred embodiments.

Unless otherwise noted, the same reference numeral in different Figures refers to the same or similar feature.

DETAILED DESCRIPTION

Figure 1:
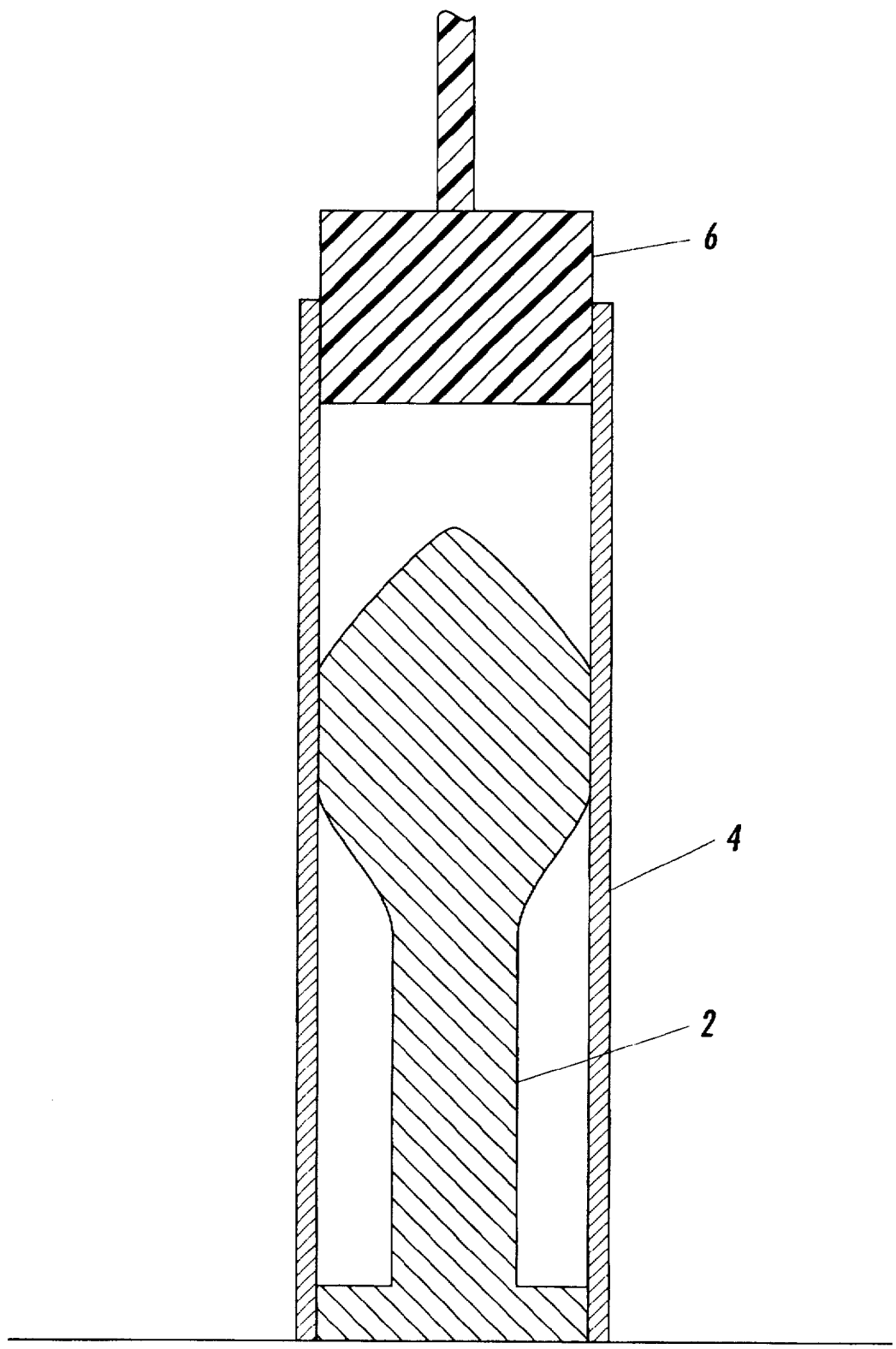
FIG. 1 represents a schematic, cross-sectional, elevational view of a conventional support device engaged with a substrate.
Figure 2:
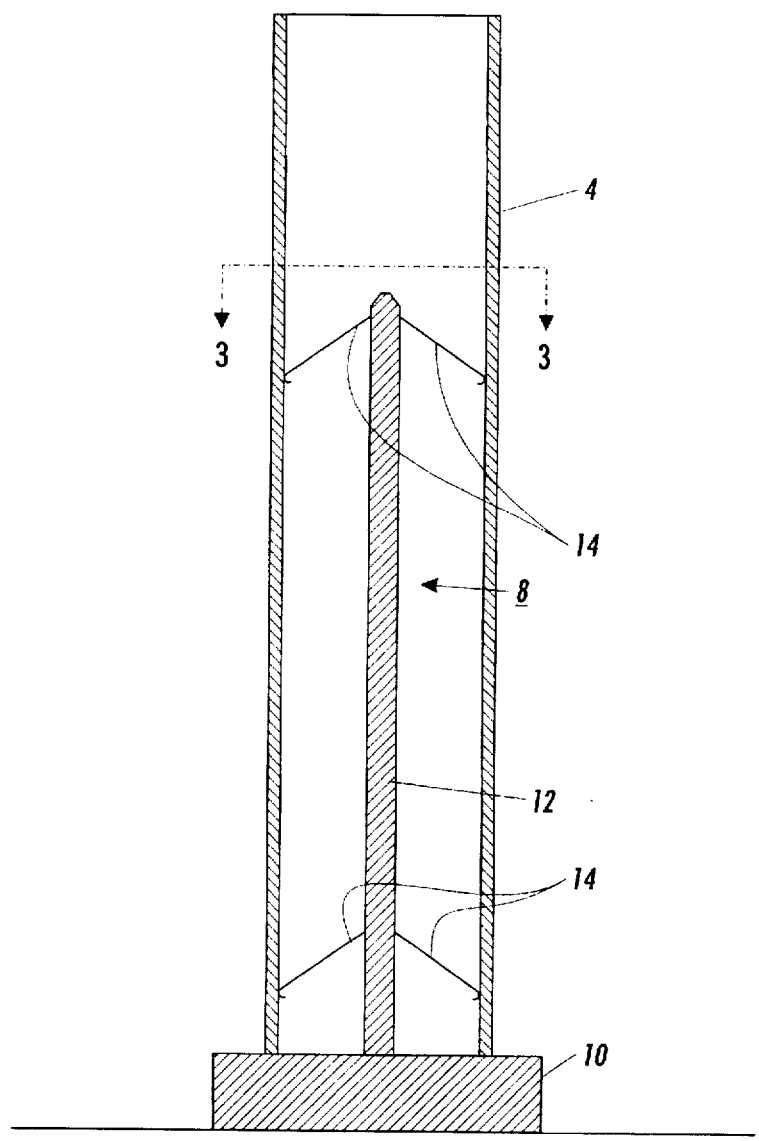
FIG. 2 represents a schematic, cross-sectional, elevational view of the inventive support device engaged with a substrate.
Figure 3:
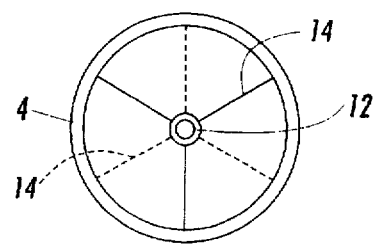
FIG. 3 represents an end view of the inventive support device of FIG. 2.

FIGS. 2–5 illustrate one embodiment of the present substrate support device 8 composed of a base 10, a post 12, and a spring apparatus 14. The post 12 is depicted as a pin shaped member mounted in a direction parallel to the longitudinal axis of the substrate. The spring apparatus 14 may be in the form of a plurality of resilient filaments such as two, three, four, five, six, or more filaments, where the filaments are depicted as wires in these figures. The filaments are preferably disposed at only the top portion and the bottom portion of the post 12 and the filaments may be radially disposed around the post. In one embodiment, there is a first group of three wires radially arranged around the top portion of the post and a second group of three wires radially arranged around the bottom portion of the post. Where the filaments are wires, the wires can be fabricated or bent to curve downwards to provide the spring action. In addition, the tip of each wire can be curved to avoid point contact and to avoid scratching the substrate interior surface where the scratching may undesirably generate debris. In each group, the wires can be radially disposed around the post equidistant from one another. As seen in FIG. 3, the wires in the two groups are preferably staggered from each other to contact more of the inner circumference of the substrate. Preferably, only the outermost region of the filaments contacts the interior surface of the substrate 4. Suitable wires (e.g., wire material, wire thickness, and wire length), the number of wires required for a particular substrate, and the degree of wire bending can be determined by trial and error. In one preferred embodiment, the wires are made from 0.025 inch stainless steel spring wire and are bent to an angle of 30 degrees to the post.

Figure 6:
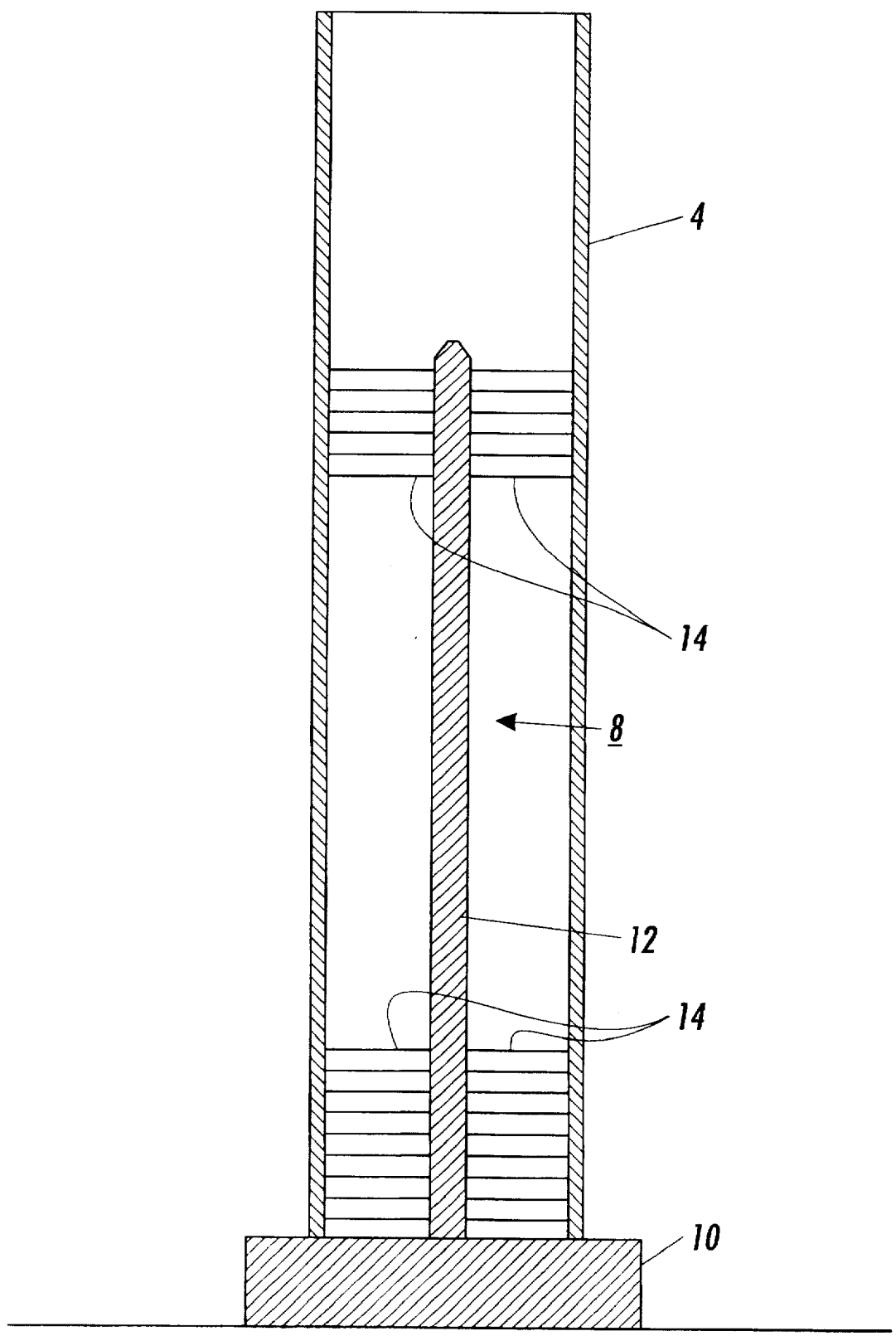
FIG. 6 represents a schematic, cross-sectional, elevational view of another embodiment of the inventive support device engaged with a substrate.

FIG. 6 illustrates another embodiment of the support device 8 composed of a base 10, a post 12, and a spring apparatus 14 in the form of a plurality of resilient filaments where the filaments are depicted as bristles. Thus, the support device 8 of FIG. 6 is similar to a bottle brush. The filaments are preferably disposed at only the top portion and the bottom portion of the post and the filaments may be radially disposed around the post. Preferably, only the outermost region of the filaments contacts the interior surface of the substrate 4. Suitable bristles (e.g., bristle material, bristle thickness, and bristle length) and the number of bristles required for a particular substrate can be determined by trial and error. The bristles may be for example 0.012 inch nylon filaments. Where the bristles are smaller in diameter and/or exhibit less stiffness than metal wires, more bristles may be used.

The spring apparatus 14 can be any resilient component or material that functions like a spring which can be compressed and then which spontaneously expands in a manner suitable for use in the present support device. The spring apparatus may be a nonspiral material such as open cell foam or the filaments described herein. Preferably, the spring apparatus can be resilient filaments such as wires and bristles. The phrase resilient filaments includes flexible bristles and flexible wires, as well as relatively stiff or rigid materials like stiff wires that are not inherently resilient but can be bent or shaped to form resilient members. Preferably, the spring apparatus contacts as much of the inner circumference of the substrate as possible (i.e., 360 degrees around the inner surface of the substrate); this will allow the support device to align the substrate in the desired orientation regardless of the direction in which the substrate may be misaligned on the support device.

In the present invention, the post 12 can be coupled to the base 10 by any suitable technique such as by using screws or pins. In addition, the spring apparatus can be coupled to the post by any suitable technique such as welding, swaging, adhesives, or the like. The base may have a flat surface and preferably has a slippery surface provided by making the base from a material having a low coefficient of friction such as for example TEFLON™, nylon, or ultra high molecular weight polyethylene. The filaments can be coated with a layer of the same or different slippery material (i.e., material having a low coefficient of friction) used to fabricate the base.

The spring apparatus facilitates positioning of the substrate on the support device in an aligned orientation. The phrase aligned orientation means the substrate orientation desired by the operator. For example, in embodiments, the phrase aligned orientation refers to a substrate that is neither tilted nor off center on the support device. Thus, in a preferred aligned orientation of the substrate on the support device, the post is mounted at a right angle to the base, the post is concentrically positioned within the substrate, and the filaments generally have the same length. The desired aligned orientation can be controlled by for example the angle of the post to the base (the post need not be perpendicular to the base), the position of the post within the substrate (the post need not be concentrically positioned), the length of the filaments (filaments on opposite sides of the post may have unequal lengths).

Figure 4:
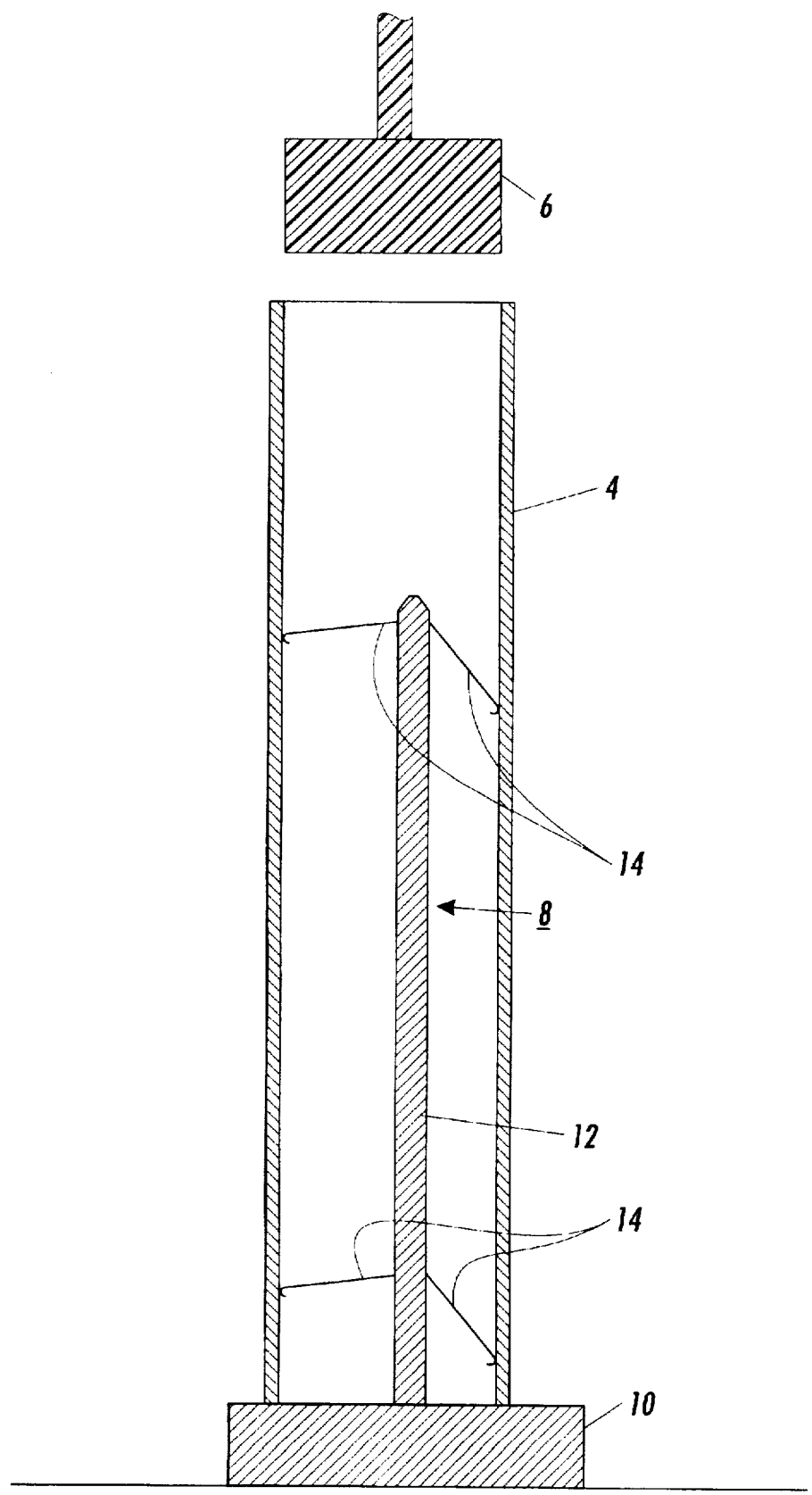
FIG. 4 represents a schematic, cross-sectional, elevational view of the inventive support device of FIG. 2 engaged with an off center substrate.
Figure 5:
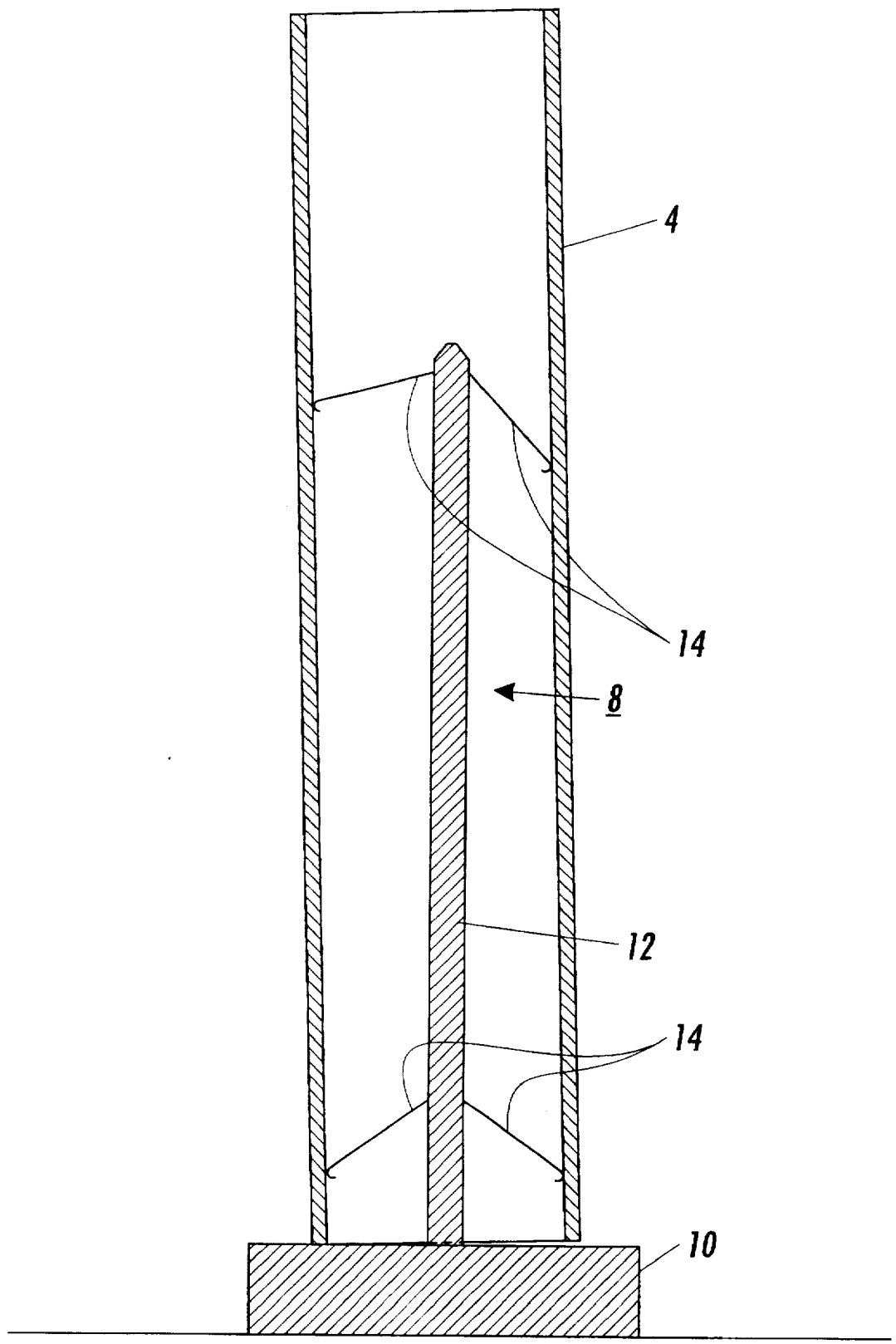
FIG. 5 represents a schematic, cross-sectional, elevational view of the inventive support device of FIG. 2 engaged with a tilted substrate.

FIGS. 4–5 illustrate the operation of the present support device when the substrate is misaligned. When the substrate is either off center (FIG. 4) or tilted (FIG. 5), the substrate compresses a number of the depicted filaments. The compressed filaments spring back to push the substrate to the aligned orientation of FIG. 2. The embodiment of the spring apparatus depicted in FIG. 6 operates in a similar manner.

The substrate can be a hollow cylinder having two open ends, where the cylinder can be rigid or flexible. Preferably, the substrate is employed in the fabrication of a photoreceptor having a layer of a photosensitive material. In a manufacturing process, substrates ranging in number from 2 to 200 substrates, preferably from 8 to 100 substrates, may be handled or processed as a single batch or group. Each substrate can be mounted on a support device at various points in the manufacturing process, thus requiring 2 to 200 support devices, preferably 8 to 100 support devices, to accommodate each group of substrates.

The present support device is not considered a chucking apparatus because the chucking apparatus and the support device engage the substrate at different ends of the substrate. For example, in FIGS. 2–6, the chucking apparatus 6 would engage the substrate end opposite to the substrate end in contact with the base of the support device. In addition, in preferred embodiments of the present support device, the resilience of the spring apparatus is defined by the spring apparatus being unable to prevent the substrate from slipping completely off the spring apparatus when the support device and the substrate are inverted (i.e., when the substrate and support device are positioned upside down as compared with the orientation depicted in FIG. 2). The support device may be insufficiently compliant if the spring apparatus is able to prevent the substrate from slipping off the spring apparatus when the support device and the substrate are inverted. In contrast, it is common for a chucking apparatus to be able to securely hold the substrate when the substrate is suspended by the chucking apparatus even during movement of the chucking apparatus and the substrate.

The present invention offers a number of benefits. For example, the present support device can push the substrate to an aligned orientation while allowing the substrate to move or tilt if necessary during placement of the substrate onto the support device or removal of the substrate from the support device. Also, in embodiments, the present support device desirably minimizes heat flow during a substrate drying process due to the small contact region between the spring apparatus and the substrate, the low mass of the post and the spring apparatus, and an optional coating on the spring apparatus which can reduce thermal conductivity.

Other modifications of the present invention may occur to those skilled in the art based upon a reading of the present disclosure and these modifications are intended to be included within the scope of the present invention.

We claim:

1. A device for supporting a hollow substrate having two open ends in an aligned orientation, wherein one end of the substrate is engageable with a chuck assembly, comprising:

(a) a base for contacting the other end of the substrate;

(b) a post coupled to the base, wherein a section of the post is positioned within the substrate, thereby defining a substrate disposed post section; and (c) a spring apparatus coupled to the substrate disposed post section, wherein the spring apparatus is disposed within the substrate and contacts the substrate interior surface, wherein the spring apparatus is compressed by the substrate during misalignment of the substrate with the device and the compressed spring apparatus spontaneously springs back to push the substrate to the aligned orientation with the device.

2. The device of claim 1, wherein the spring apparatus comprises a plurality of resilient filaments.

3. The device of claim 2, wherein the filaments are wires.

4. The device of claim 2, wherein the filaments are bristles.

5. The device of claim 2, wherein the substrate disposed post section defines a top portion, middle portion, and bottom portion and the filaments are disposed only in the top portion and the bottom portion of the substrate disposed post section.

6. The device of claim 2, wherein the substrate has a longitudinal axis and the post is a pin shaped member mounted in a direction parallel to the longitudinal axis of the substrate.

7. The device of claim 2, wherein the filaments have an outermost region that contacts the substrate interior surface.

8. The device of claim 2, wherein die base has a slippery surface.

9. The device of claim 2, wherein the filaments are radially disposed around the post.

10. The device of claim 2, wherein the filaments include a coating of a slippery material.

* * * * *